United States Patent
Bannon et al.

(10) Patent No.: US 10,747,844 B2
(45) Date of Patent: Aug. 18, 2020

(54) SYSTEMS AND METHODS FOR CONVERTING A MATRIX INPUT TO A VECTORIZED INPUT FOR A MATRIX PROCESSOR

(71) Applicant: Tesla, Inc., Palo Alto, CA (US)

(72) Inventors: Peter Joseph Bannon, Woodside, CA (US); William A McGee, San Jose, CA (US); Emil Talpes, San Mateo, CA (US)

(73) Assignee: Tesla, Inc., Palo Alto, CA (US)

( * ) Notice: Subject to any disclaimer, the term of this patent is extended or adjusted under 35 U.S.C. 154(b) by 160 days.

(21) Appl. No.: 15/839,234

(22) Filed: Dec. 12, 2017

(65) Prior Publication Data

US 2019/0179870 A1    Jun. 13, 2019

(51) Int. Cl.
| | |
|---|---|
| *G06F 17/16* | (2006.01) |
| *G06F 17/15* | (2006.01) |
| *G06F 12/0875* | (2016.01) |
| *G06T 5/10* | (2006.01) |
| *G06F 9/00* | (2006.01) |

(52) U.S. Cl.
CPC .............. *G06F 17/16* (2013.01); *G06F 9/00* (2013.01); *G06F 12/0875* (2013.01); *G06F 17/153* (2013.01); *G06T 5/10* (2013.01); *G06F 2212/60* (2013.01)

(58) Field of Classification Search
CPC ......... G06F 17/15; G06F 17/153; G06F 17/16
See application file for complete search history.

(56) References Cited

U.S. PATENT DOCUMENTS

| | | | |
|---|---|---|---|
| 8,117,314 | B2 | 2/2012 | Croft et al. |
| 8,190,905 | B1 | 5/2012 | Chang et al. |
| 10,140,251 | B2 | 11/2018 | Zhou et al. |
| 10,310,768 | B1 * | 6/2019 | Gauria ............... G06F 3/0656 |
| 2005/0193050 | A1 | 9/2005 | Sazegari |
| 2011/0153707 | A1 | 6/2011 | Ginzburg et al. |
| 2015/0106596 | A1 | 4/2015 | Vorbach et al. |
| 2016/0239706 | A1 | 8/2016 | Dijkman et al. |
| 2018/0300613 | A1 * | 10/2018 | Petre ..................... G06N 3/10 |
| 2019/0004795 | A1 * | 1/2019 | Kuramoto ........... G06F 7/5443 |
| 2019/0079764 | A1 * | 3/2019 | Diamond ............ G06F 9/3001 |
| 2019/0138567 | A1 * | 5/2019 | Martin ................. G06N 3/063 |

(Continued)

OTHER PUBLICATIONS

L. Li, Y. Tong, H. Zhang and D. Wan, "Memory Saving Method for Enhanced Convolution of Deep Neural Network," 2018 11th International Symposium on Computational Intelligence and Design (ISCID), pp. 185-188, 2018 (Year: 2018).*

(Continued)

*Primary Examiner* — Matthew D Sandifer
(74) *Attorney, Agent, or Firm* — Knobbe, Martens, Olson & Bear, LLP (57) ABSTRACT

Presented are systems and methods that accelerate the convolution of an image and similar arithmetic operations by utilizing hardware-specific circuitry that enables a large number of operations to be performed in parallel across a large set of data. In various embodiments, arithmetic operations are further enhanced by reusing data and eliminating redundant steps of storing and fetching intermediate results from registers and memory when performing arithmetic operations.

21 Claims, 4 Drawing Sheets

(56) References Cited

U.S. PATENT DOCUMENTS

2019/0220734 A1* 7/2019 Ferdman ................ G06F 17/15

OTHER PUBLICATIONS

A. Anderson, A. Vasudevan, C. Keane, and D. Gregg, "Low-memory GEMM-based convolution algorithms for deep neural networks ," arXiv preprint arXiv:1709.03395, 2017 (Year: 2017).*

Minsik Cho and Daniel Brand. MEC: Memory-efficient convolution for deep neural network. In Proc. International Conference on Machine Learning (ICML), pp. 815-824, 2017 (Year: 2017).* math.com, "Vector Definitions", 2005, retrieved from www.math.com/tables/oddsends/vectordefs.htm.*

International Search Report and Written Opinion of the International Searching Authority dated Mar. 25, 2019, in International Patent Application No. PCT/US18/65036, filed Dec. 11, 2018 (8 pgs).

* cited by examiner

SYSTEMS AND METHODS FOR CONVERTING A MATRIX INPUT TO A VECTORIZED INPUT FOR A MATRIX PROCESSOR

A. TECHNICAL FIELD

The present disclosure relates to the conversion of an M×N data matrix into a vectorized input for a high-performance matrix processor, and more particularly, to methods and systems for mapping an M×N matrix into a one-dimensional vector that is aligned to the matrix processor to enable complex mathematical operations to be performed on large 2-dimensional and 3-dimensional matrices.

B. DESCRIPTION OF THE RELATED ART

One skilled in the art will recognize the ever-increasing demands of speed and performance on general processors and systems that are used to implement time-sensitive and complex mathematical operations. As these general systems are used to process large amounts of data and perform complex mathematical operations, the computational resources and the rate of calculations are limited by the capabilities of existing general hardware designs that perform those calculations. For example, general-purpose computing devices and processors that execute matrix operations may be unable to perform these operations in a timely manner under certain circumstances. Many conventional multipliers that perform digital signal processing operations rely on a series of software and hardware matrix manipulation steps and may represent a bottleneck within a time-sensitive system. Oftentimes, these steps involve a processor's arithmetic functions that generate intermediate results at the expense of wasting computing time due to the added steps of storing and fetching intermediate results from various locations to complete an operation. In one instance, an input matrix oftentimes needs to be converted to a different format or architecture in order to be input into a processing element. This conversion process may cause a meaningful delay within the system as inputs need to be formatted into a particular structure to be subsequently processed by a calculation processor or other arithmetic logic.

Figure 1:
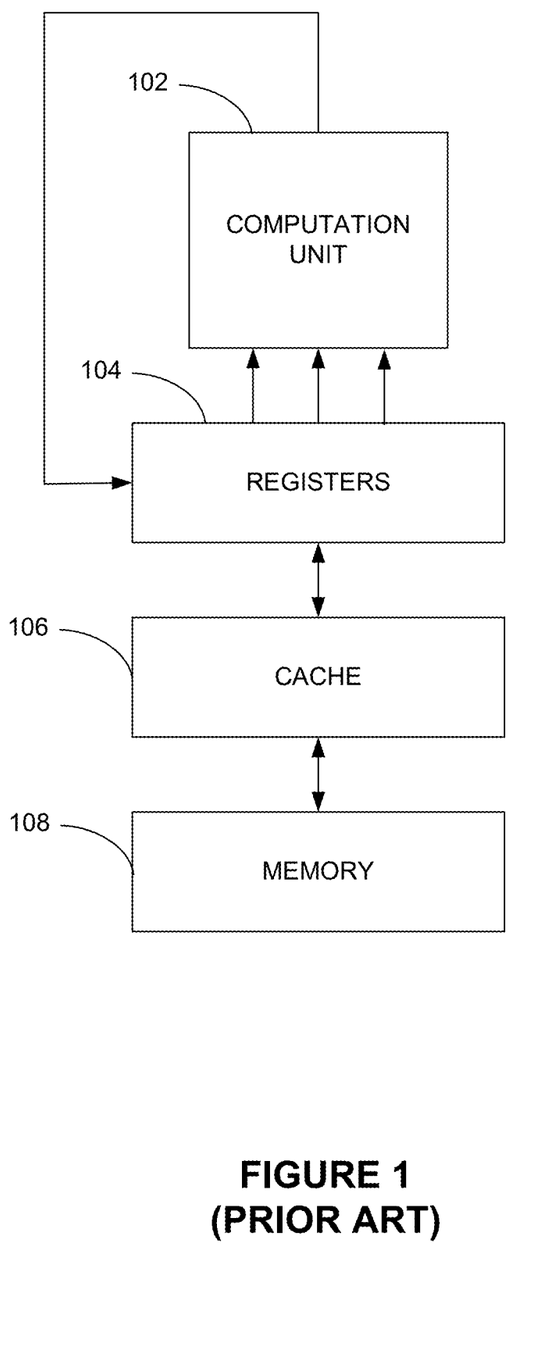
FIG. 1 shows an example of a conventional matrix multiplication system.

FIG. 1 shows an example of a conventional matrix multiplication system. System 100 is a scalar machine that comprises computation unit 102, registers 104, cache 106, and memory 108. In operation, computation unit 102 uses registers 104 and cache 106 to process data stored in memory 108. The processed data is, for example, image data and weights used for a convolution operation to process an image. Typically, computation unit 102 is a microprocessor, such as a CPU or GPU, capable of performing a matrix multiplication on input matrices to obtain a resultant matrix, e.g., by converting multiplications into additions and outputting the result into some internal register.

For example, a dot product that represents an output pixel of an image is typically generated by dot-multiplying individual matrix elements from two matrices to obtain partial results, which are then added to obtain the final dot product. A multiplication of individual matrix elements, i.e., a scalar multiplication, is typically performed on individual data elements by breaking up the dot multiplication into a series of individual sub-operations. As a result, partial products have to be stored and fetched from one or more of registers 104, cache 106, and memory 108 to complete a single arithmetic operation.

Computationally demanding applications, such as a convolution, oftentimes require a software function to be embedded in computation unit 102 and used to convert convolution operations into alternate matrix-multiply operations. This is accomplished by rearranging and reformatting image data and weight data into two matrices that then can be raw matrix-multiplied. However, there exists no mechanism to efficiently share or reuse data in scalar machine 100, such that data necessary to execute each scalar operation has to be re-fetched from registers each time. The complexity of these operations becomes significantly greater as the amount of image data subject to convolution operations increases.

The inability to reuse much of the data in scalar machine 100 coupled with the added steps of storing and fetching intermediate results from registers 104, cache 106, and memory 108 to complete an arithmetic operation are only some of the shortcoming of existing systems, such as multiplier system 100.

Accordingly, what is needed are efficient conversion methods and devices that convert a matrix into a appropriate input structure for high-computational-throughput systems and methods that can perform matrix multiplication operations.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

Although embodiments herein are discussed mainly in the context of convolutions, one of skill in the art will appreciate that a deconvolution can also be structured as matrix-matrix type multiply operation and, thus, the principles of the present invention are equally applicable to deconvolutions. Furthermore, other types of mathematical operations may be implemented in accordance with various embodiments of this disclosure.

The description will describe the conversion of at least one input matrix into a vectorized input for a convolution matrix multiplication circuit; however, one skilled in the art will recognize that the described methods and structures may be used to convert a wide range of input data types from one format to another. All of these different input data structures fall within the scope of the present description.

Figure 2:
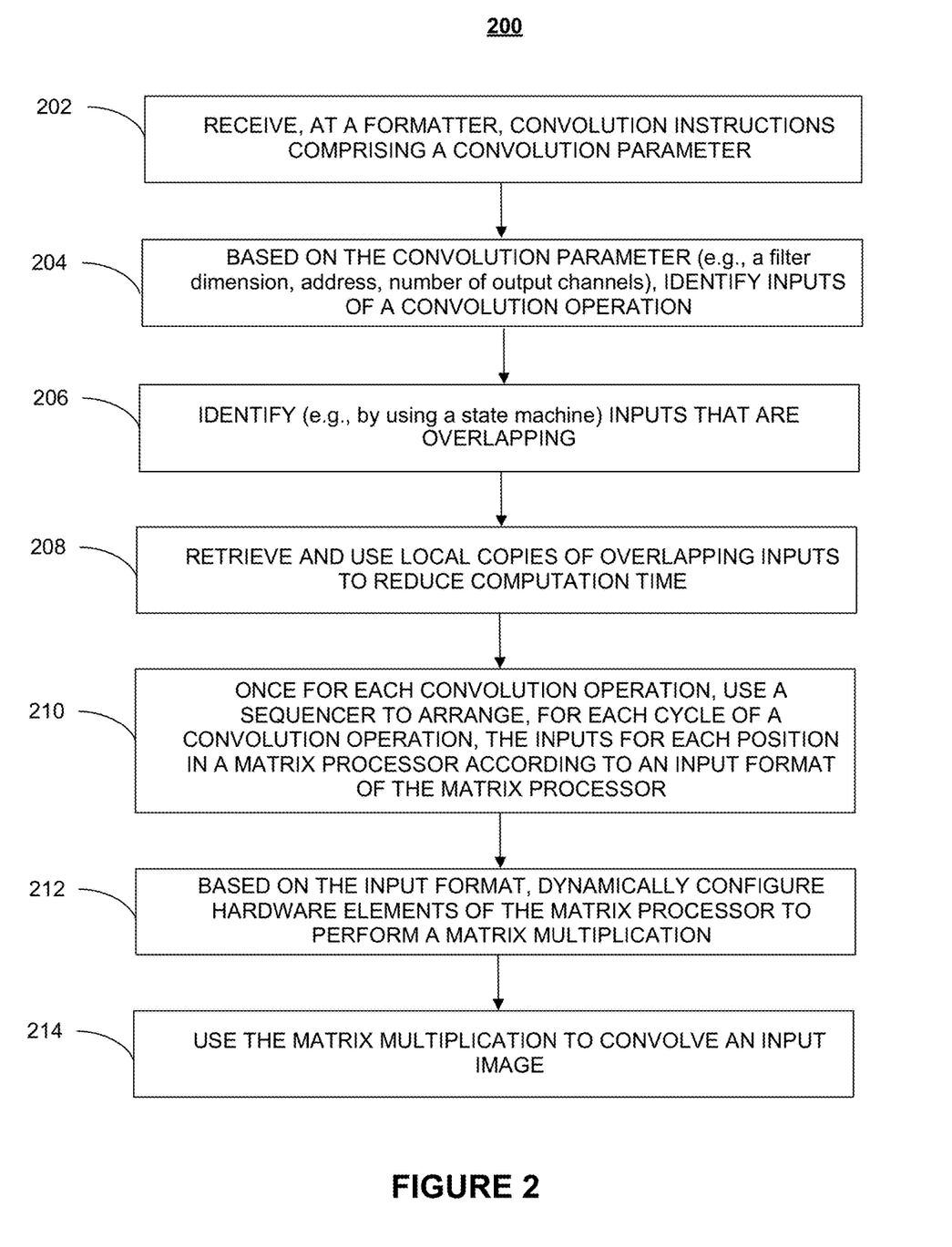
FIG. 2 is a flowchart of an illustrative process for mapping convolutions to a matrix multiplication circuit according to various embodiments of the present disclosure.

FIG. 2 is a flowchart of an illustrative process for mapping convolutions to a matrix multiplication circuit according to various embodiments of the present disclosure. Process 200 begins at step 202 when convolution instructions that comprise a convolution parameter are received, for example, at a data formatting device. Convolution instructions or parameters may be, for example, a filter dimension, a stride, an address of an input, or a certain number of outputs channels.

At step 204, based on the convolution parameters, inputs of a convolution operation are identified. In embodiments, the inputs are stored in one or more storage locations at different addresses that may, in embodiments, represent a three-dimensional data matrix. In embodiments, the matrix has a first dimension that corresponds to a number of pixels that are calculated in parallel for a given output channel, a second dimension that corresponds to a number of outputs channels that operate in parallel, and a third dimension corresponding to different colors for each pixel.

At step 206, overlapping/redundant input data is identified, for example, by a state machine. In embodiments, the state machine uses a filter parameter, such as a filter size and a stride, to determine reusable operands.

At step 208, in order to reduce computation time and power consumption, local copies of overlapping input data may be retrieved from a cache or buffer to avoid having to fetch the same data again, e.g., from SRAM.

At step 210, for each convolution operation, a sequencer may be used to arrange the inputs according to locations in a matrix processor, e.g., based on a predetermined input format of the matrix processor such that the matrix processor can perform high-performance arithmetic operations, e.g., a large matrix multiplication. In embodiments, the sequencer arranges inputs for each cycle of a convolution operation. In certain embodiments, the sequencer maps data between a two-dimensional matrix into a vector that is used to input the data into the matrix processor. For example, the sequencer may perform an element-by-element (e.g., bit-by-bit or byte-by-byte) mapping that effectively moves data/operands based on its position within the two-dimensional matrix into corresponding position in the vector. Once the inputs are arranged, in embodiments, an aligner may align the arranged data and feed it into the matrix processor in accordance with a predefined sequence.

At step 212, based on the input format, hardware elements of the matrix processor may be dynamically configured to perform a matrix multiplication. In embodiments, the matrix processor input accommodates a first vector comprising operands that are formatted according to a data input matrix, and a second vector comprising operands that are formatted according to a weight input matrix.

Finally, at step 214, the matrix multiplication result may be used, e.g., to convolve an input image with a filter to produce a convolution result. In embodiments, the convolution result may be further processed, e.g., to enhance an image output, by using a non-linear function, a normalization operation, and/or a pooling operation.

It is noted that although the processes and systems disclosed herein are described in the context of convolutions methods and systems, this is not intended as a limitation on the scope of the present disclosure as the teachings of the present disclosure can be equally applied to deconvolution methods and systems.

Figure 3:
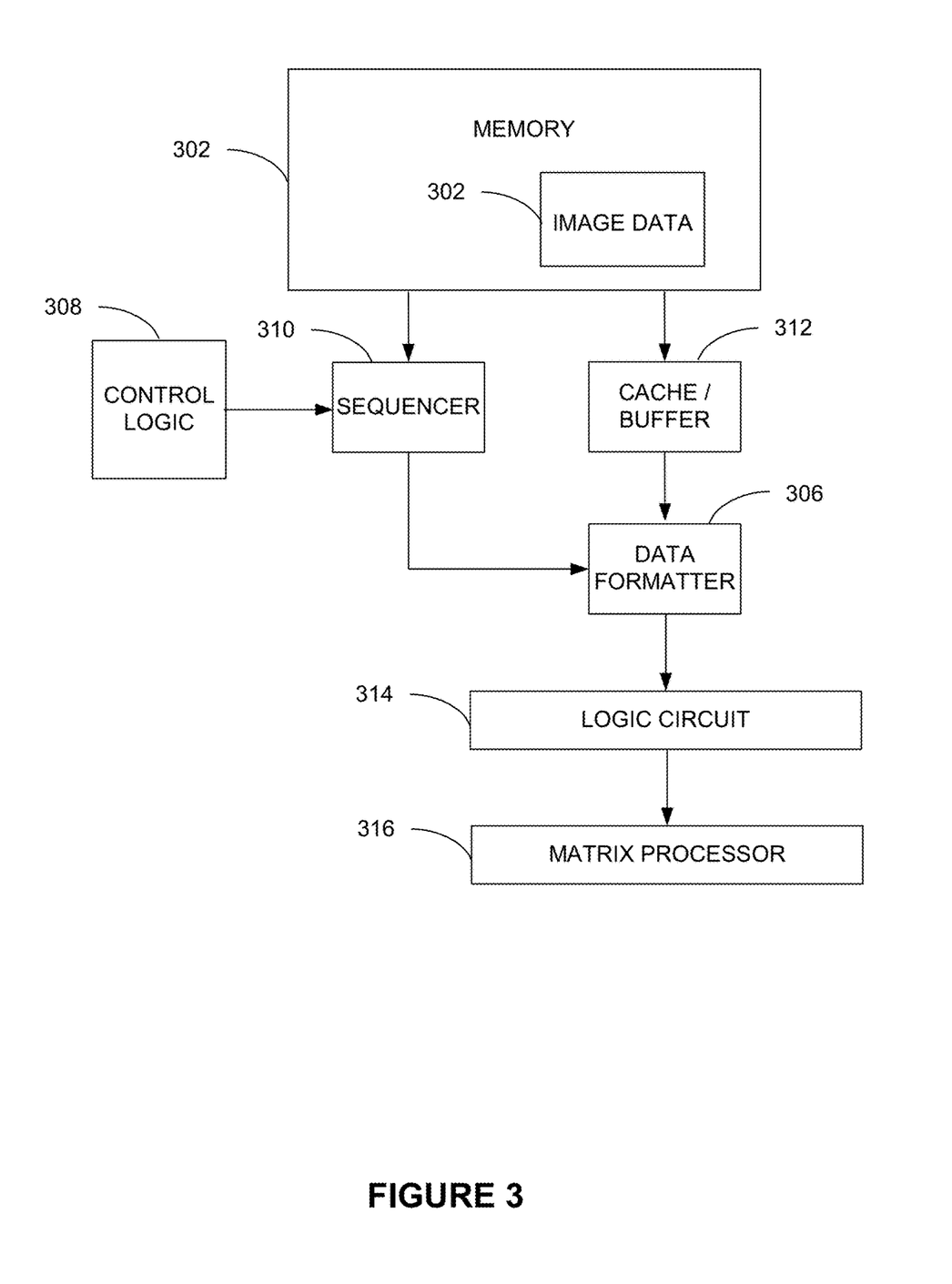
FIG. 3 illustrates an exemplary matrix multiplication system utilizing a data formatter for mapping convolutions to a multiplication circuit according to various embodiments of the present disclosure.

FIG. 3 illustrates an exemplary matrix multiplication system utilizing a data formatter for mapping convolutions to a multiplication circuit according to various embodiments of the present disclosure. System 300 comprises memory device 302, data formatter 306, control logic 308, cache (or buffer) 312, logic circuit 314, and matrix processor 316, and sequencer 310. It is understood that one or more component in FIG. 3, e.g., data formatter 306 and sequencer 310 may be implemented as an integrated component that performs at least some function associated with each individual integrated component.

Data formatter 306 may be implemented as an in-line formatter and, in embodiments, is used to convert a data input matrix into a vector format that can be efficiently processed by matrix processor 316.

Memory device 302 in FIG. 3 is any memory device known in the art and may comprise any type of data, such as audio data, sensor data, and ultrasonic data. In embodiments, memory 302 comprises image data 304 that is stored in one or more locations and at different addresses. In embodiments, the addresses may represent a multi-dimensional data matrix.

In embodiments, control logic 308 may manage sequencer 310 and other component within matrix multiplication system 300. Control logic 308 may be embedded into data formatter 306 or sequencer 310 and, in embodiments, may select data from memory 302 locations according to filter parameters, e.g., stride, such that data formatter 306 can format the data to match expected locations in matrix multiplier 316. Cache/Buffer 312 is a local buffer that, in embodiments, may be used to store a local copy of data for reuse by a convolution so as to avoid having to re-access and re-read data from memory 302.

Logic circuit 314 may comprise circuitry that represents any number of input operators and data registers. In embodiments, logic circuit 314 may comprise circuitry that inputs M weight operands and N image data operands into matrix processor 316. Weight data and image data 304 may be stored in various types of memory 302 (e.g., SRAM).

Matrix processor 316, may comprise any number of circuits and sub-circuit circuits (e.g., arithmetic logic units, registers, encoders, etc.) that may perform simultaneous multiplication, accumulation, and shift operations. Each sub-circuit circuit may be a cell capable of performing arithmetic operations. In embodiments, matrix processor 316, comprises multiply-and-add circuitry that receives and multiplies, for example, data matrices and pre-formatted weight matrices to generate a multiplication product for a convolution operation.

A convolution operation may apply to the image data a set of individual filters, i.e., a set of weights that have been pre-formatted and stored in memory 302, for a number of input channels that may contain a different set of information. This allows to detect a wide variety of features in an input image.

In addition, by analyzing a sequence of different features in different order, macro features may be identified in the image. In embodiments, convolution involves the multiplication of a rectangular input matrix with a rectangular weight matrix to obtain partial dot products that are summed (e.g., by an adder) to generate an accumulated dot product (i.e., an integer) that represents an output pixel in an output image.

In embodiments, arithmetic operations are parallelized by utilizing multiple rows and columns of matrix processor 316 to generate an N×N tile output. For example, a given row size of 96 and a corresponding column size of 96 facilitate an output of 9216 pixels. Matrix processor 316 may accommodate any vector length on each axis and, in embodiments, is dimensioned as an M×N matrix processor comprising P×Q tiles that are arranged in a matrix format.

In embodiments, sequencer 310, receives, e.g., from control logic 308, convolution instructions that comprise any number of convolution parameters. In embodiments, convolution instructions may comprise filter parameters (e.g., filter size), a number of outputs channels, etc. In embodiments, sequencer 310 uses convolution parameters to identify inputs or addresses of inputs of a convolution operation and receives or fetches those inputs from the corresponding address locations in memory 302.

In embodiments, data formatter 306 converts two-dimensional or three-dimensional data comprising image information into a single vector or string that may be represented by a row or column, thus, linearizing or vectorizing the image data. In embodiments, formatter 306 prepares image data 304 for processing by matrix processor 316 by mapping, according to convolution parameters, image data 304 into a suitable format according to the hardware requirements of matrix processor 316 such that matrix processor 316 can perform a matrix multiplication as part of a convolution calculation, e.g., to generate output pixels.

In embodiments, the size of the vectorized image data is directly related to the number of inputs into matrix processor 316, such that operands are aligned with inputs into matrix processor 316.

In embodiments, data formatter 306 identifies, e.g., via a state machine, inputs that are overlapping, i.e., identical or redundant, and may exists in one or more location that would have to be accessed twice or more for a given convolution operation. The state machine may be configured to use filter parameters, such as a filter size and a stride to identify the overlapping data as reusable data, such that matrix processor 316 may reuse operands without having to re-access and transfer data from a memory 302. Instead, in embodiments, the reusable data may be loaded from local copies stored, e.g., in cache 312, thereby, reducing computational efforts, time, and power consumption.

In embodiments, data sequencer 310 may, for example for each convolution operation, arrange the retrieved inputs according to positions expected by matrix processor 316 in each cycle of a convolution operation, e.g., to match a given input format of matrix processor 316 when carrying out a dot multiplication. Sequencer 310 may generate addresses for reading data, write the results, and keep track of the state of system 300 when performing a convolution operation. In embodiments, sequencer 310 uses some or all of this information to determine from which addresses within memory 302 to obtain data and how to process it in a manner such that it can be properly used by matrix processor 316, e.g., in a subsequent convolution step. In embodiments, sequencer 310 is coupled to data formatter 306 that may be used to align the retrieved and synchronized image data with matrix processor 316 in a predefined order according to the given input format.

In embodiments, based on the input format as determined by various input parameters or configurations, hardware elements of matrix processor 316 may be dynamically configured to perform any type of arithmetic operation (e.g., Multiply Accumulate Multiply Add). In embodiments, the input to matrix processor 316 comprises a vector that is formatted according to a data input matrix. In embodiments, the input comprises a second vector that is formatted according to a weight input matrix, e.g., such that a matrix multiplication may be used to convolve image data 304 for a neural network.

In embodiments, formatting is performed dynamically to accommodate processing of matrices that have different input sizes. In embodiments, the reformatted matrixes comprising input channels are fed into cache/buffer 312. In embodiments, cache/buffer 312 fetches data from memory 302 and stores a local copy of data that may be reused by a convolution without the need to reaccess memory 302 to read the data.

Unlike common software implementations of formatting functions that are performed by a CPU or GPU to convert a convolution operation into a matrix-multiply operation by rearranging data to an alternate format that is suitable for a fast matrix multiplication, various hardware implementations of the present disclosure re-format data on the fly and make it available for execution, e.g., 96 pieces of data every cycle, in effect, allowing a relatively large number of elements of a matrix to be processed in parallel, thus efficiently mapping convolutions to a matrix operation. In embodiments, for 2N fetched input data $N^2$ compute data may be obtained.

It is understood that system 300 may comprise additional components that fall within the scope of the present disclosure, e.g., post-processing elements, such as a hardware-accelerated pooling unit, a DRAM that may be part of a DMA that retrieves data from memory 302 and stores data (e.g., weights and results) in SRAM, and other post-processing elements know in the art.

Figure 4:
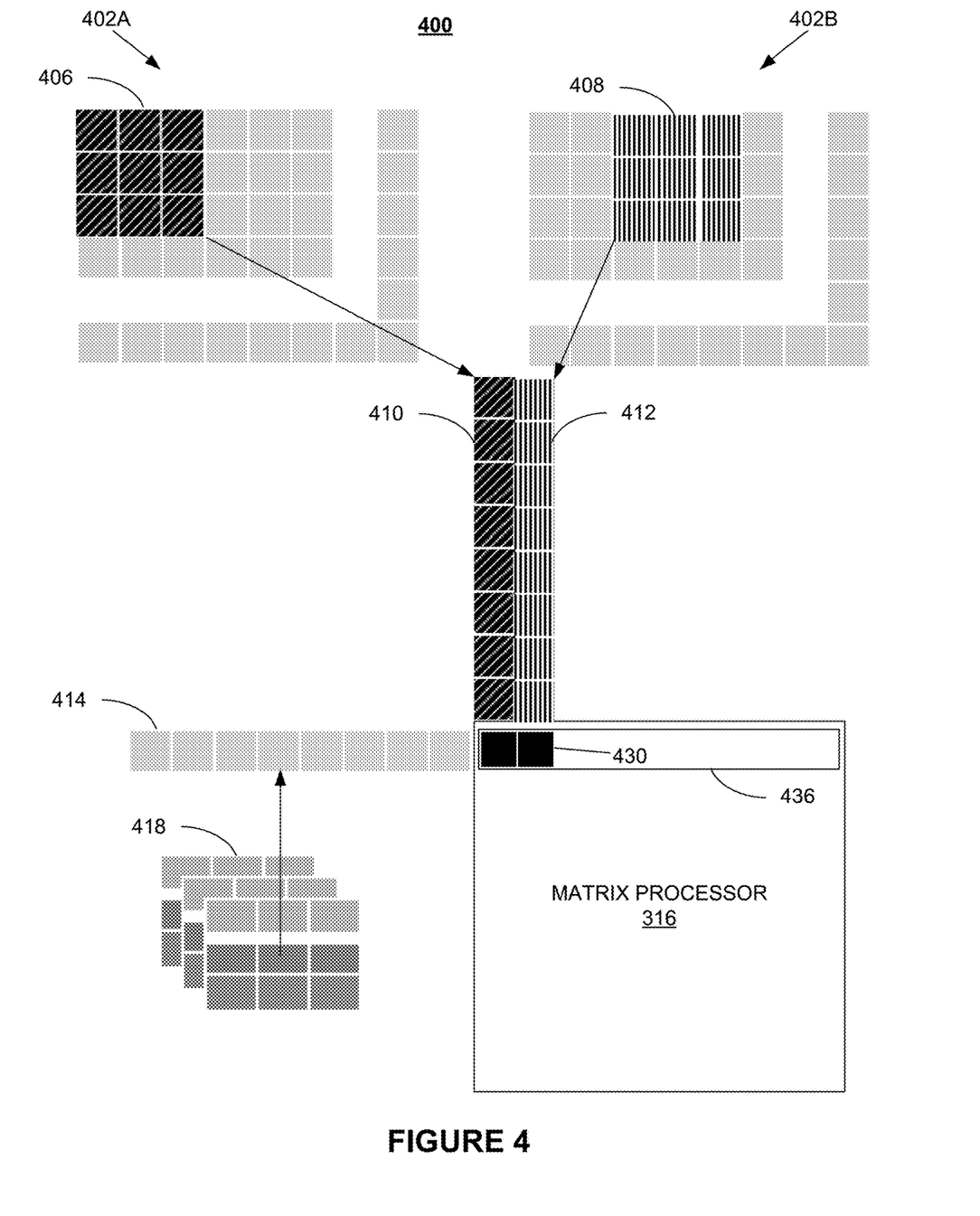
FIG. 4 is an exemplary diagram illustrating the process for mapping convolutions to a matrix multiplication circuit according to various embodiments of the present disclosure.

FIG. 4 is an exemplary diagram illustrating the process for mapping convolutions to a matrix multiplication circuit according to various embodiments of the present disclosure. In diagram 400, each matrix 402A, 402B is depicted with a highlighted section that comprises sub-matrix 406, 408, e.g., a sub-matrix 406 for an input channel associated with a certain color. Matrix 418 represents one or more input matrices, such as weight data matrices. Matrix processor 316 is preferably a processor of the kind discussed with reference to FIG. 3.

In embodiments, data matrix 402A, 402B forms part of a three-dimensional data matrix that comprises any number of rows, columns, and channels that can hold input data, such as image data for three different colors. Similarly, matrix 418 is a rectangular input weight data matrix that may comprise any number of rows and columns to hold weight data for the three different colors. One skilled in the art will recognize that the sizes of input matrices and number of input channels may vary for different applications.

FIG. 4 further depicts array 410, 412 that, in embodiments, may be obtained by linearizing respective data sub-matrix 406, 408 to generate a linearized version thereof. Conversely, weight data matrix 418 may be vectorized to obtain array 414. As an example, in embodiments, 3×3 sub-matrix 406 for a first input channel associated with a first color, a 3×3 sub-matrix 406 for a second input channel associated with a second color, and a third 3×3 sub-matrix 406 for a third input channel associated with a third color are assembled to form array 410. Assuming a stride of 2, locations to another 3×3 sub-matrix 408 are identified within data matrix 402B to form array 412, and so on, until all input columns of matrix processor 316 can be filled with input data. Similarly, input weight data can be reformatted to form additional output channels similar to array 414.

In embodiments, three 3×3 weight data matrices 418 that may represent three separate input channels may be re-formatted (e.g., by the formatter discussed with reference to FIG. 3) into a vector that comprises a total of 27 elements from which a 27-element array (e.g., array 414) may be produced for use in a convolution operation performed by matrix processor 316.

In detail, data matrix 402A, 402B may be multiplied with weight data matrix 418 as part of a convolution operation, for example, by dot multiplying each element in array or row 414 corresponding to, e.g., the 3×3×3 elements of weight matrix 418 with each element in array or column 410 corresponding to, e.g., the 3×3×3 elements of sub-matrix 406 to produce partial dot products that may be accumulated by matrix processor architecture 316 to generate accumulated dot product 430 that may represent, e.g., an output pixel in an output image. The next dot product may be obtained by dot-multiplying row 414 with a vector corresponding to column 412, and so on, such the values of partial dot products correspond to the application of weight matrix 418 to input data matrix 402A, 402B and the accumulator output represents the entire convolution. In embodiments, matrix processor is 96×96 in size, which allows for 9216 multiply accumulate operations to be performed in parallel, e.g., in a single clock cycle.

In embodiments, in the calculation of output channels, matrix processor may produce the same output pixels using the same set of input data from matrix 402A, 402B but different set of weights (i.e., filters) from matrix 418, such that by reading the input data once many output channels can be generated at once. One or more input channels, e.g., one for each color (e.g., RGB) may be used. For example, each convolution may use weights 418 that represent three different matrices, one for each color.

Each output channel 436 may be generated using a different filter or weight 418 that represents a different a feature in the input data. The number of output channels may depend on the number of features. In embodiments, the number of convolutions equals the number of output channels 436 times the number of input channels, and each convolution may have N convolutions for each input channel.

It is understood that input data matrix 402A, 402B, weight data matrix 418, and array 410-414 may have different numbers of columns and rows as those depicted in FIG. 4. As precisely indicated, the number of input and output channels may be arbitrarily chosen. In embodiments, when weight data matrix 418 is known, array 414 may be generated and stored in a vectorized format without the use of a formatter. In embodiments, dot-multiplications may be simultaneously performed to generate a one-shot matrix-matrix multiply operation.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for mapping matrix data to an input of a matrix processor, the method comprising:
   receiving first matrix data to be processed by the matrix processor;
   identifying a length of an input vector associated with the matrix processor;
   mapping the first matrix data to the input vector using a first element-by-element sequence operation;
   using a state machine that uses at least one filter parameter to identify at least one element within the first matrix data that is redundant with a second matrix data to be processed by the matrix processor;
   fetching the at least one redundant element from a memory and storing it within a cache, wherein the cache is a local storage location; and
   mapping the second matrix data to the input vector using a second element-by-element sequence operation such that the at least one redundant element is retrieved from the cache.

2. The method of claim 1 wherein the first matrix data and the second matrix data relate to one or more convolution operations.

3. The method according to claim 2 wherein for each convolution operation the element-by-element sequence operation is performed once.

4. The method of claim 1 wherein the first element-by-element sequence operation is equivalent to the second element-by-element sequence operation.

5. The method of claim 1 wherein retrieving the at least one redundant element from the memory reduces a total computation time by eliminating the computation time required to fetch the at least one redundant element from an SRAM.

6. The method of claim 1 further comprising a step of identifying at least one hardware configuration of the matrix processor relevant to the step of identifying the length of the input vector.

7. The method of claim 6 wherein the at least one hardware configuration of the matrix processor comprises a convolution parameter.

8. The method of claim 7 wherein the convolution parameter comprises one or more addresses that represent a three-dimensional data matrix.

9. The method of claim 8 wherein the convolution parameter comprises at least one of a filter size, a number of weights, and a stride.

10. The method of claim 1 wherein mapping the first matrix data to the input vector comprises aligning the first matrix data to the input vector based at least partially on a hardware configuration of the matrix processor.

11. The method according to claim 1 wherein elements of the input vector are identified for least one of each cycle of a convolution operation and each position in the matrix processor.

12. The method according to claim 1 further comprising the state machine that uses at least one of a filter size and a stride to determine the redundant element.

13. The method according to claim 1 further comprising using the method for mapping to convolve an input image.

14. The method according to claim 1 wherein a first dimension of the matrix processor corresponds to a number of pixels that for a given output channel are calculated in parallel.

15. The method according to claim 14 wherein a second dimension of the matrix processor corresponds to a number output channels that operate in parallel.

16. A system for mapping convolution data to a matrix multiplication circuit to enhance computing speed, the system comprising:
   a memory device to hold image data;
   a control logic;
   a matrix processor;
   a data formatter coupled to the control logic and the memory device, the data formatter configured to perform the steps of:
     in response to receiving convolution instructions, identifying first and second matrix data associated with a convolution operation;
     identifying a length of an input vector associated with the matrix processor;
     mapping the first matrix data to the input vector using an element-by-element sequence operation;
     using a state machine that uses at least one filter parameter to identify at least one element within the first matrix data that is redundant with a second matrix data to be processed by the matrix processor;
     fetching the at least one redundant element from a memory and storing it within a cache, wherein the cache is a local storage location; and
     mapping the second matrix data to the input vector using the element-by-element sequence operation such that the at least one redundant element is retrieved from the cache.

17. The system according to claim 16 further comprising a logic circuit to generate the input vector.

18. The system according to claim 16 wherein the matrix processor comprises a plurality of sub-circuits that perform dot-multiplications using the first and second matrix data to generate dot products to output a convolution result.

19. The system according to claim 18 wherein the convolution result is an output matrix that corresponds to an application of a filter to an area of an image.

20. The system according to claim 16 further comprising a sequencer that performs the sequence operation.

21. The system according to claim 16 wherein the data formatter comprises the state machine that uses at least one of a filter size and a stride to determine the redundant element.

* * * * *

UNITED STATES PATENT AND TRADEMARK OFFICE
CERTIFICATE OF CORRECTION

PATENT NO. : 10,747,844 B2  
APPLICATION NO. : 15/839234  
DATED : August 18, 2020  
INVENTOR(S) : Peter Joseph Bannon Page 1 of 1

It is certified that error appears in the above-identified patent and that said Letters Patent is hereby corrected as shown below:

On the Title Page

In Column 2, item (74), Attorney, Agent, or Firm, Line 1, delete "Polson" and insert --Olson--.

In the Claims

In Column 10, Line 22, Claim 11, delete "least" and insert --at least--.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*